United States Patent
Barker

(10) Patent No.: US 7,905,667 B2
(45) Date of Patent: Mar. 15, 2011

(54) COMPACTIBLE WALKING STAFF HAVING TRIPOD BASE AND ADAPTABLE MOUNT

(75) Inventor: John Christopher Barker, Oceanside, OR (US)

(73) Assignee: Trek Technologies, LLC, Lake Oswego, OR (US)

( * ) Notice: Subject to any disclaimer, the term of this patent is extended or adjusted under 35 U.S.C. 154(b) by 763 days.

(21) Appl. No.: 11/825,325

(22) Filed: Jul. 3, 2007

(65) Prior Publication Data

US 2008/0011344 A1 Jan. 17, 2008

Related U.S. Application Data

(63) Continuation-in-part of application No. 11/083,676, filed on Mar. 16, 2005, now Pat. No. 7,344,320.

(60) Provisional application No. 60/554,298, filed on Mar. 17, 2004.

(51) Int. Cl.
*G03B 17/56* (2006.01)
*A45B 3/00* (2006.01)

(52) U.S. Cl. .............. 396/419; 135/66; 135/75; 135/84; 248/155.1; 248/155.5; 248/187.1

(58) Field of Classification Search ................. 396/419, 396/427, 428; 135/66, 75, 77, 84; 248/155–155.5, 248/157, 166, 170, 187.1
See application file for complete search history.

(56) References Cited

U.S. PATENT DOCUMENTS

| | | | | |
|---|---|---|---|---|
| 345,852 A * | 7/1886 | Leermo | ...................... | 248/155.2 |
| 493,285 A * | 3/1893 | Nixon | ........................ | 248/155.2 |
| 499,719 A * | 6/1893 | Dabney | ...................... | 248/155.2 |
| 714,043 A * | 11/1902 | Seitz | .............................. | 248/170 |
| 1,089,295 A * | 3/1914 | Vallier | ........................ | 248/155 |
| 1,138,417 A * | 5/1915 | Rottenberg | ................... | 248/155 |
| 1,679,267 A * | 7/1928 | Rieger | .......................... | 248/155 |
| 3,286,212 A * | 11/1966 | Thompson et al. | ........ | 248/187.1 |
| 4,062,372 A * | 12/1977 | Slusher | ............................ | 135/66 |
| 5,438,786 A * | 8/1995 | Hilderbrand | ...................... | 42/94 |
| 6,192,908 B1 * | 2/2001 | Smith | ............................. | 135/66 |
| 6,769,824 B2 * | 8/2004 | Nakatani | ...................... | 396/419 |
| 7,344,320 B2 * | 3/2008 | Barker et al. | ................ | 396/419 |
| 2004/0118985 A1 * | 6/2004 | Omps | ....................... | 248/181.1 |

* cited by examiner

*Primary Examiner* — W. B. Perkey
(74) *Attorney, Agent, or Firm* — Steven J. Adamson

(57) ABSTRACT

A walking staff apparatus having a tripod assembly that is releasably fastened to a main shaft. The tripod assembly may be released from the shaft to achieve a compact arrangement for transport or storage. The shaft may also be telescoping to achieve a compact size. The release joint may include a mechanism for centering the shaft and tripod assembly. A magnetic-based mechanism for releasable attachment of an article may be coupled to the shaft. The magnetic-based attachment mechanism may include an anti-rotation device to achieve secure positioning of an article releasable attached to the shaft.

20 Claims, 6 Drawing Sheets

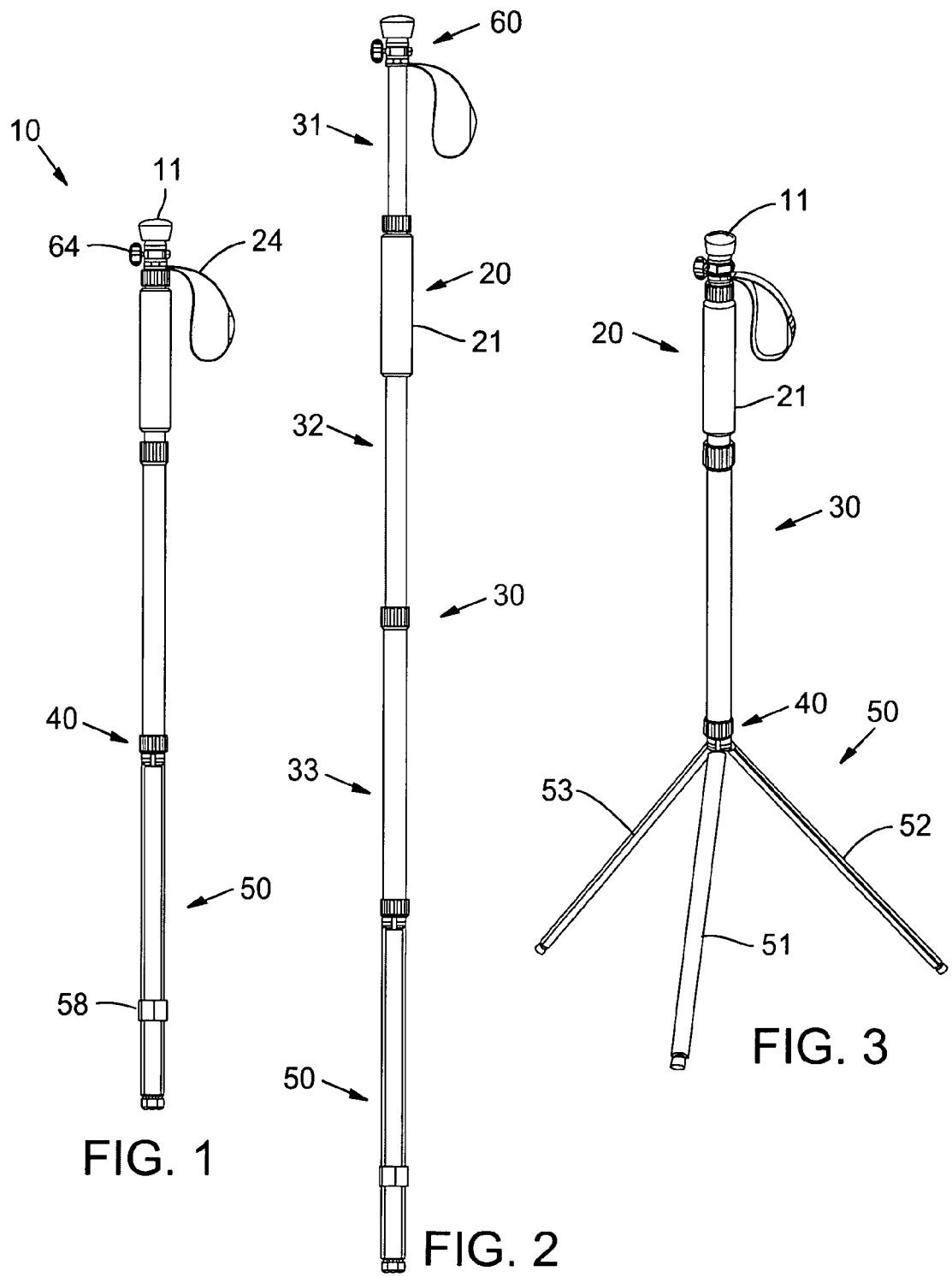

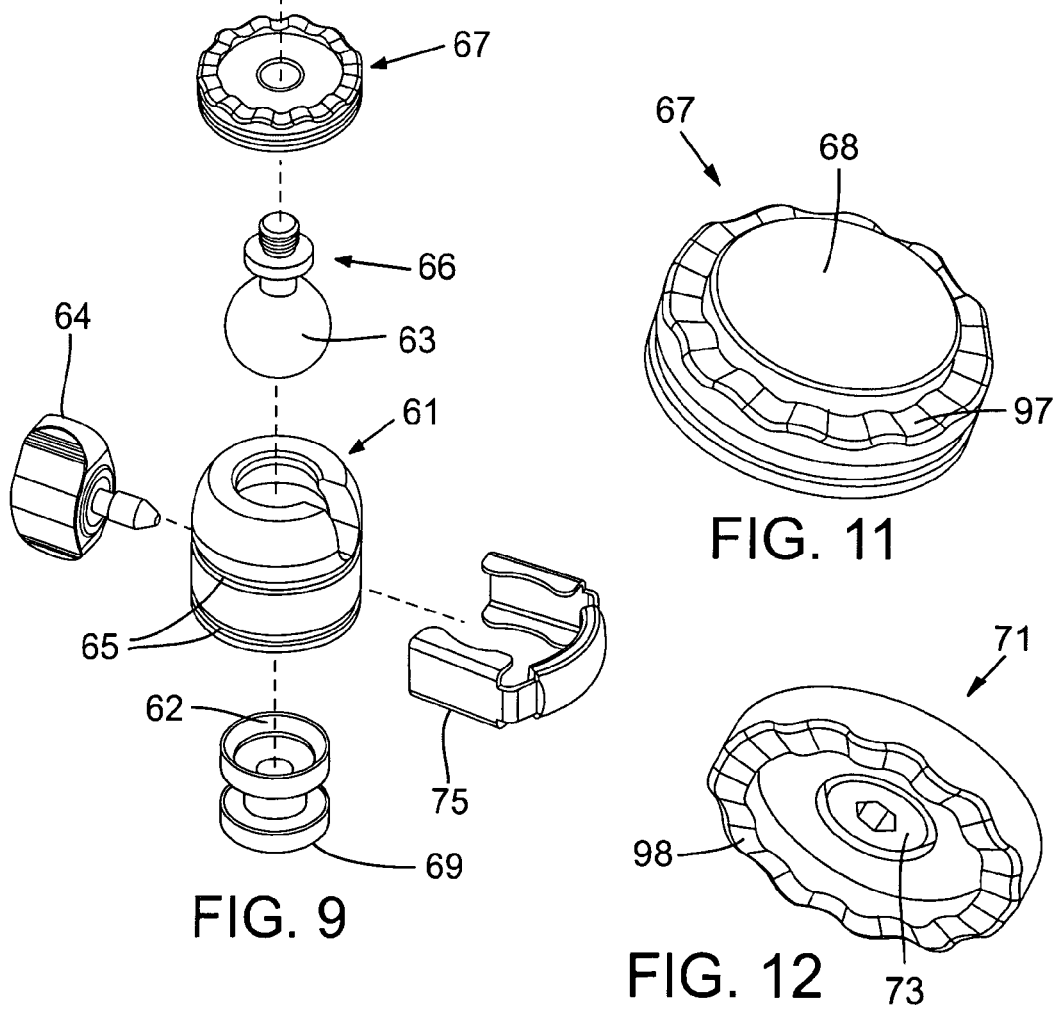
FIG. 9
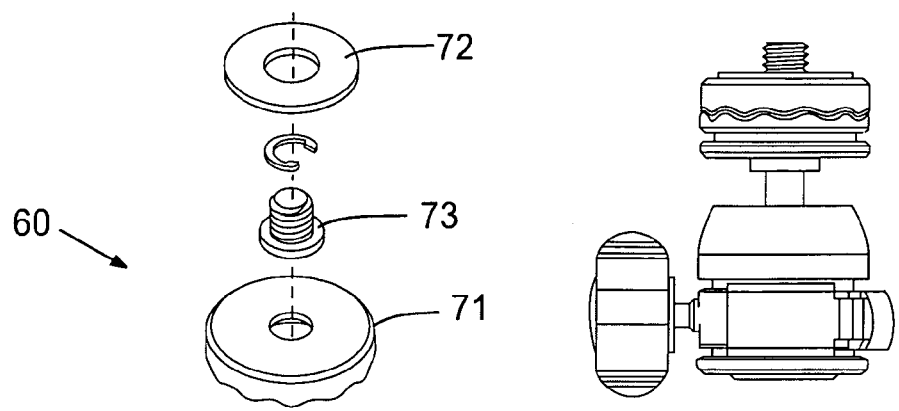
FIG. 10
FIG. 11
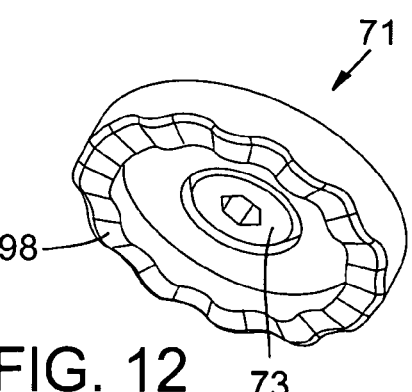
FIG. 12

COMPACTIBLE WALKING STAFF HAVING TRIPOD BASE AND ADAPTABLE MOUNT

CROSS-REFERENCE TO RELATED APPLICATION

This application is a continuation-in-part of U.S. patent application Ser. No. 11/083,676, filed Mar. 16, 2005 now U.S. Pat. No. 7,344,320, and entitled Walking Staff having Tripod Base and Adaptable Mount. Application Ser. No. 11/083,676 claims the benefit of U.S. Provisional Application No. 60/554,298, filed Mar. 17, 2004, entitled Walking Staff with Tripod Base and having a common inventor.

FIELD OF THE INVENTION

The present invention relates to a compactible staff for use in walking, photography, hunting, or the like. More specifically, the present invention relates to a compactible walking staff that is disassembleable and/or configurable into a compact size for transport and storage, yet possesses in an assembled form sufficient structural integrity to be used as a monopod or a tripod. A walking staff of the present invention is lightweight and may include an adaptable mount to receive a camera, gun rest, spotting scope or other item.

BACKGROUND OF THE INVENTION

Various walking staff and like devices are known in the art. These include the devices described in U.S. Pat. No. 1,679,267 for a Combined Walking Stick and Tripod; U.S. Pat. No. 4,062,372 for an Articulated Walking Cane; U.S. Pat. No. 5,438,786 for a Pistol Rest; and U.S. Pat. No. 6,085,766 for a Geary Convertible Crutch System.

While these devices make a contribution to the art of walking staffs and tripods, they are disadvantageous for several reasons including, but not limited to, being too bulky, heavy or complicated, or not being sufficiently stable, strong, lightweight or compactible.

For example, each of the devices shown in the '267, '786 and '766 patents disclose some degree of telescoping, for height adjustment or compacting for storage. The amount of telescoping, however, is limited and thus fails to reduce the overall length to a more desirable length, for example, to conveniently fit inside luggage or under a seat or other location where people that are travelling would want to stow the device.

Various disassembleable shaft structures are known and include lightweight items such as tent poles and the like. These structures, while being desirably lightweight, tend to have insufficient structural integrity for use in the present invention.

With respect to other disadvantageous aspects of prior art staffs, the tripod device of the '786 patent is disadvantageous in that the size of the tripod is small relative to the height of its staff, providing limited stability. The tripod configuration of the '786 patent also utilizes lateral supports (for the tripod legs) which add undesirably to the weight and bulk of the device. Additional weight and bulk are disadvantageous in a walking staff, particularly near the tip because a user must precisely place the tip between stones, roots and other obstacles (using primarily the strength of their hand and forearm). In addition, the lateral supports (and related components) increase the complexity of the tripod mechanism and thus, the incidence of mechanical failure, e.g., lateral supports and related components are vulnerable to being bent, broken or otherwise failing. Furthermore, given the multiple parts and their interrelation, field repair is difficult if not impossible.

Prior art staffs and like devices also fail to provide an adaptable mechanism for the rapid, secure and releasable mounting of a camera, spotting scope, gun rest, or other item.

SUMMARY OF THE INVENTION

Accordingly, it is an object of the present invention to provide a walking staff having a tripod that is lightweight, adjustable in height, and capable of being compacted to a small size for travel and/or storage.

It is another object of the present invention to provide such a walking staff that provides releasable attachment of the leg assembly to aid achieve a sufficiently compact size.

It is also an object of the present invention to provide such a walking staff that permits releasable attachment of a camera, rest, scope, clamp or other article in a manner that is rapid, secure and not prone to movement once attached.

These and related objects of the present invention are achieved by use of a compactible walking staff having a tripod base and adaptable mount as described herein.

In one embodiment, the present invention includes a shaft, a handle region provided at a top portion of the shaft, and a tripod assembly provided below and extending from the shaft that includes at least three legs and is movable between a closed position in which the legs are retracted to form a monopod and an open position in which the legs are extended outwardly. The tripod assembly is releasably coupled to the shaft through a fastening mechanism that includes a first tapered surfaces provided on the shaft and a second tapered surface, complementary to the first tapered surface, provided on the tripod assembly, the complementary first and second surfaces serving to center the tripod assembly with the shaft when the tripod assembly is releasably fastened to the shaft.

In another embodiment, the present invention may include a shaft with a handle region provided at a top portion thereof and a tripod assembly provided below and extending from the shaft that includes at least three legs and is movable between a closed position in which the legs are retracted to form a monopod and an open position in which the legs are extended outwardly. The tripod assembly is preferably releasably coupled to the shaft through a releasable fastening mechanism and the releasable tripod assembly, in the closed position, is less than approximately half the overall height of the walking staff apparatus.

In yet another embodiment, the present invention may include a shaft having a handle region provided at a top portion thereof, a tripod assembly that is releasably coupled to the shaft through a releasable fastening mechanism, and a magnetic-based releasable mount mechanism coupled to the shaft, the mount mechanism including a first member and a second member that are releasably coupled through magnetic attraction, the first member being fixedly coupled to the shaft and the second member adapted for attachment to an ancillary article.

The attainment of the foregoing and related advantages and features of the invention should be more readily apparent to those skilled in the art, after review of the following more detailed description of the invention taken together with the drawings.

BRIEF DESCRIPTION OF THE DRAWINGS

FIGS. 1-3 are perspective views of one embodiment of a compactible walking staff having an in-staff release joint in accordance with the present invention.

FIGS. 9-10 are an exploded perspective view and a side elevation view of an adaptable movable mount of the staff of FIGS. 1-3, respectively, in accordance with the present invention.

FIGS. 11-12 are a perspective view of a plate and a disk of the movable mount of FIGS. 9-10 in accordance with the present invention.

DETAILED DESCRIPTION

Referring to FIGS. 1-3, perspective views of one embodiment of a compatible walking staff 10 having an in-staff release joint 40 in accordance with the present invention is shown. FIGS. 1 and 2 illustrate staff 10 in an unextended and a fully extended monopod or walking staff configuration, respectively. FIG. 3 illustrates staff 10 unextended and in the tripod position.

Figure 4:
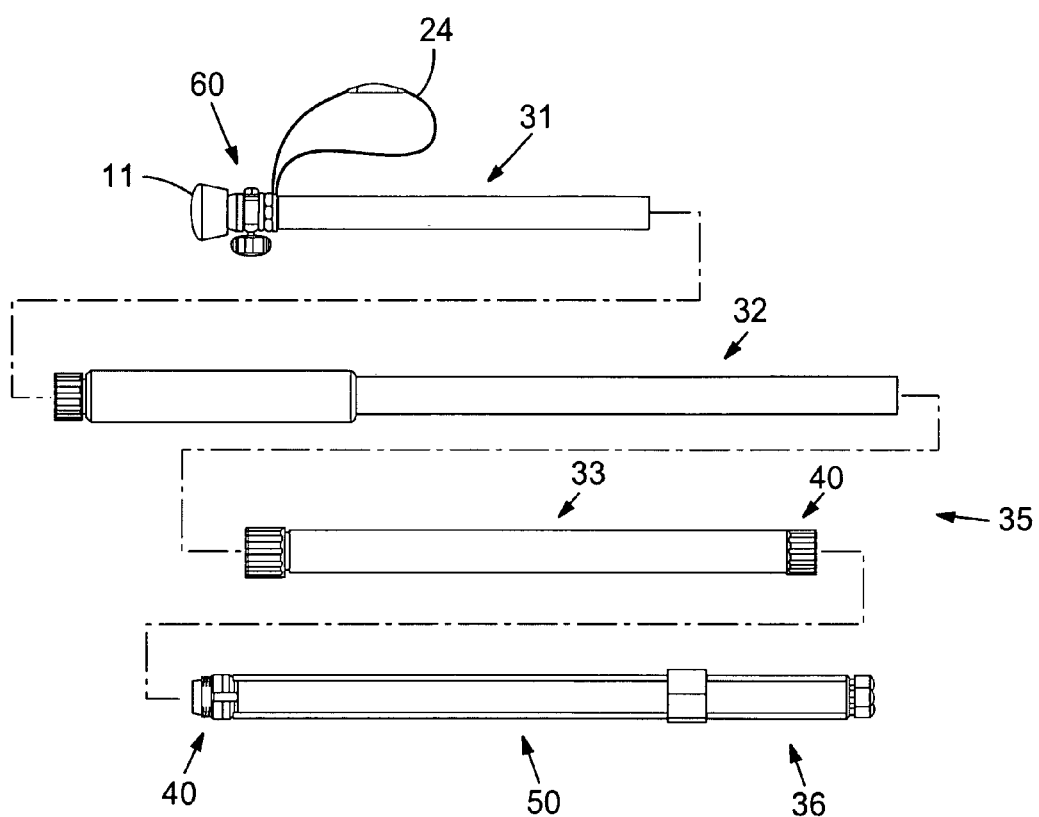
FIG. 4 is a side elevation view of staff of FIGS. 1-3 in a compacted configuration for transport and/or storage.

Referring to FIG. 4, a side elevation view of staff 10 in a compacted configuration for transport and/or storage in accordance with the present invention is shown.

Staff 10 may include a palm rest 11 mounted above a handle region 20. Handle region 20 may include an appropriately shaped grip 21 made of cork, rubber or other suitable material. An adjustable strap 24 may be provided proximate the grip.

The handle region is preferably provided toward the top of a shaft 30. The in-staff release joint 40 is preferably provided toward the bottom of shaft 30. Shaft 30 may be, but is not necessarily, telescoping.

In the embodiment of FIGS. 1-4, shaft 30 includes three telescoping sections 31-33, with the palm rest mounted to top section 31, grip 21 to middle section 32 and in-staff release joint 40 provided below or in bottom section 33.

A tripod assembly 50, including a plurality of tripod legs 51-53, is preferably provided below release joint 40. A leg strap or the like 58 may be used to maintain the tripod legs 51-53 in their "retracted" or monopod position as shown in FIG. 1.

As discussed in more detail below, releaseable joint 40 is uniquely configured to permit ready disassembly and reduced overall length of staff 10 (for stowage, transport, etc.) while permitting ready re-assembly in a manner that provides secure attachment and a high degree of structural integrity.

The present invention also includes an adaptable mount that permits releasable and secure attachment of palm rest 11 or other items such as a camera, spotting scope, gun or arm rest, surveying equipment, clamps for holding lights or other articles, or any other suitable ancillary article.

In FIGS. 1-4, one embodiment of an adaptable movable mount in accordance with the present invention is shown. Mount 60 is discussed in more detail with reference to FIGS. 9-13. A locking screw 64 is shown extending from movable mount 60 that is used to release and set the mount in a desired position.

In FIG. 3, the tripod legs 51-53 are shown in their expanded or "tripod" position. Leg tension may be set by a user as described below and permits a user to position legs 51-53 in a desired arrangement (to accommodate uneven ground or limited space, etc.). While shaft 30 is shown at the same height as in FIG. 1, it should be recognized that shaft 30 may be extended to any height up to that shown in FIG. 2.

Referring to FIG. 4, staff 10 is shown in a compacted position with the sections 31-33 of telescoping shaft 30 disconnected and release joint 40 released to separate staff 10 into a shaft section 35 and a tripod section 36. Separating the shaft components in this manner achieves the smallest overall length. Alternatively, to achieve a small length, though not as small as that of FIG. 4, the shaft components may be retracted (rather than disconnected), achieving a short, compact arrangement that includes only two pieces. In the embodiment of FIG. 4, the lower shaft section has a larger diameter than the middle and upper sections. This larger diameter, for example, for lower section 33, provides greater stability at release joint 40 and a larger and stronger base for attachment of the tripod legs.

Release joint 40 preferably utilizes a tapered threaded fitting or the like for secure, centered and structurally sound connection of the tripod section 36 to the shaft section 35. The tapered threaded fitting reduces or eliminates play that may develop between a non-tapered threaded fitting and thus achieves a walking staff device that is more rigid and durable.

Figures 5, 6:
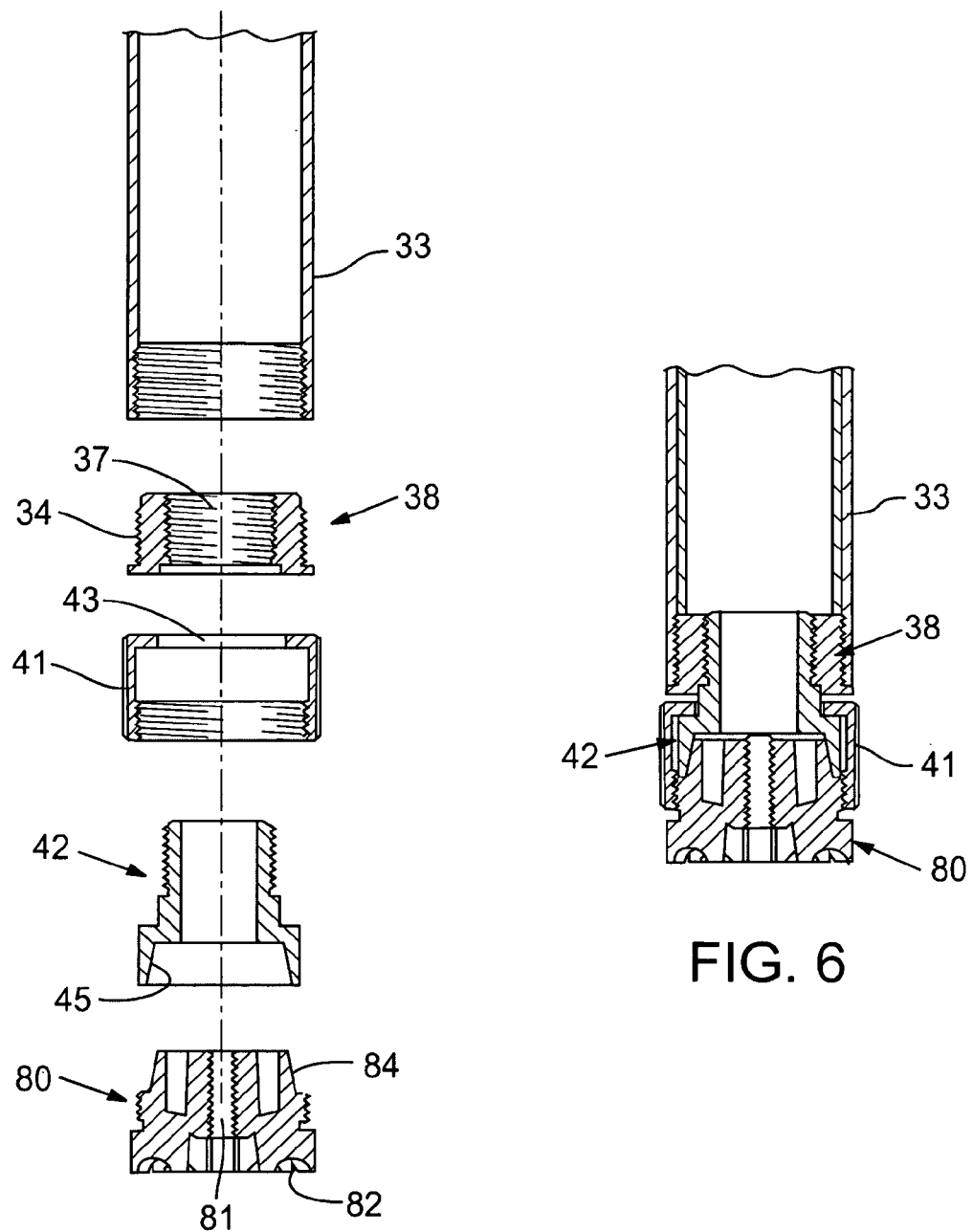
FIGS. 5-6 are an exploded cross-sectional view and an assembled cross-sectional view, respectively, of one embodiment of a release joint in accordance with the present invention.

Referring to FIGS. 5-6, an exploded cross-sectional view and an assembled cross-sectional view of one embodiment of a release joint 40 in accordance with the present invention is shown. FIG. 5 illustrates a threaded sleeve 38 that is mounted into the bottom of the lower section 33 of shaft 30. Sleeve 38 may have interior and exterior threads 34,37. While sleeve 38 is shown threaded to the lower section of shaft 30, it may be glued, press-fit and/or otherwise mounted to the lower section.

A threaded component, termed a fitting receiver 42, extends upward through an opening 43 in locking nut 41 and is permanently threaded to sleeve 38. The locking nut 41 is free to rotate on fitting 42.

The hinge mounting plug 80 is fixedly attached to the tripod leg assembly as discussed below with reference to FIGS. 7-8. To mount the tripod section 36 to the shaft section 35, locking nut 41 is screwed onto mounting plug 80. The mounting disk is preferably configured to have a conically beveled or tapered surface 44 that is formed complementarily to surface 45 of fitting receiver 42. This achieves a secure, centered mounting of the mounting disk 80 to fitting receiver 42.

The secure mounting of the tripod section to the shaft section creates the functional monopod or tripod arrangements shown in FIGS. 1-3. The tapered threaded fitting between mounting plug 80 and fitting 42 provides a rigid joint that more evenly distributes forces from shaft 30 to tripod legs 51-53 and yet can be quickly disassembled for convenient storage.

Figure 7:
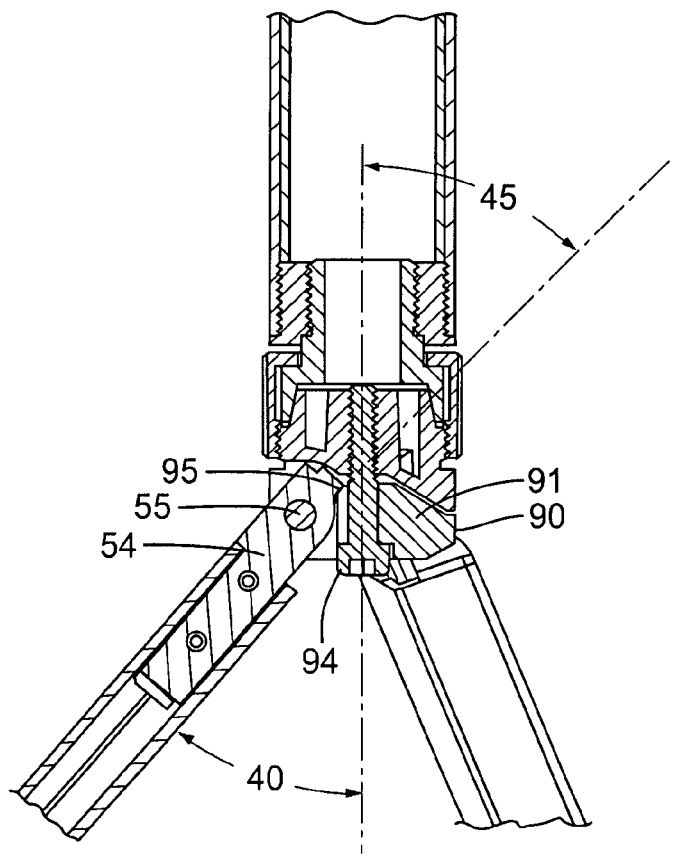
FIGS. 7-8 are a cross-sectional view of the release joint and the tripod assembly with the tripod legs in the expanded position and the retracted position, respectively, in accordance with the present invention.
Figure 8:
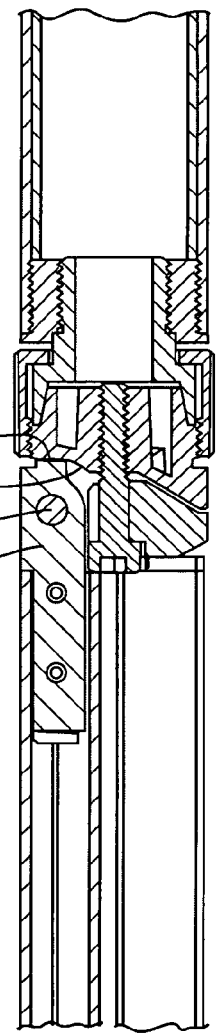

Referring to FIGS. 7-8, cross-sectional views of joint 40 and tripod assembly 50 with the tripod legs in the expanded position and the retracted position in accordance with the present invention are respectively shown. The tripod assembly includes a mounting disk 90 to which the three tripod legs are attached as discussed below. Mounting disk 90 has a central opening 91 through which fastening member 94 is inserted. Fastening member 94 is fastened, by threading and/or glue or other appropriate means, to mounting plug 90 in a manner that fixedly couples the mounting disk to the mounting plug and holds the tripod legs securely, yet movably.

FIGS. 7-8 illustrate an embodiment in which fastening member 94 is threaded into a central opening 81 of mounting plug 80.

Each of the plurality of tripod legs 51-53 preferably has an extension member 54 and a coupling pin 55. Each coupling pin preferably rests in a complementarily shaped recess formed in part as recess 82 of mounting plug 80 and a recess formed in the top of mounting disk 90. When the mounting disk is fastened to the mounting plug, the coupling pins are securely held in their respective recesses.

Extension members 54 may be longitudinally positioned within legs 51-53 for increased strength and stability. Each extension member 54 preferably includes an angled bearing face 57 that contacts a complementarily configured face 95 on mounting disk 90. The angle at which these bearing faces contact one another may be any suitable load distributing angle, but is preferably between 5-70 degrees, and more preferably at approximately 45 degrees. The angled bearing surface serves to more effectively distribute the load placed on mounting disk 90 and mounting plug 80 during use.

The tripod legs may extend any suitable distance laterally. In one embodiment, they extend between 30 and 50 degrees and, more preferably, to approximately 40 degrees.

Mounting plug 80 is preferably configured with clearance 85 for each extension member to move. Extension member 54 contacts surface 59 and prevents the leg from swinging too far past vertical when retracting into the monopod or closed configuration.

While several leg attachment schemes may be used without deviating from the present invention, in one embodiment tripod legs 51-53 each include an extension member 54 that supports a mounting pin 55. Fastening member 94 couples the mounting disk to the mounting plug with the three pins 55 resting in their respective recesses in mounting disk 90. As the fastening member 94 is tightened, the mounting pins are pushed upward and into contact with walls of the corresponding recesses in mounting plug 80. Tightening the fastening mechanism further increases the compression force on mounting pins 55 and hence increases the friction on pins 55, permitting a user to adjust how resistant the legs are to movement.

Referring to FIGS. 9-10, an exploded perspective view and a side elevation view of adaptable movable mount 60 in accordance with the present invention are respectively shown. FIG. 9 illustrates various components of mount 60 configured to mount to a camera (not shown) or other device having a standard or otherwise appropriate attachment mechanism. Body 61 is configured with positioning member 69 to define the socket 62 that holds ball 63. Extender 66 protrudes from body 61 and couples to plate 67 in which magnet 68 is mounted. Security clip 75 may clip onto grooves 65 when not in use.

A magnetically active disk 71 is preferably provided for releasable attachment to magnet 68. Threaded member 73 is attached to disk 71 and permits releasable coupling of disk 71 into the threaded recess provided in most cameras, scopes and other items. A spacer washer 72 may be provided about threaded member 73 that is compliant to provide friction at the mount surface and suitably sized to act as a spacer for clip 75.

Referring to FIGS. 11-12, a perspective view of plate 67 and disk 71 in accordance with the present invention are respectively shown. Plate 67 may include a ring or other structure 97 that has a surface patterned with alternating protrusions and recesses. Disk 71 preferably has a complementarily shaped ring 98. In the embodiment of FIGS. 11-12, the ring pattern has a sinusoidal shape, though it should be recognized that any suitable complementary patterns that permits indexing is suitable and with the present invention.

The complementary index pattern of plate 67 and disk 71 is provided for multiple reasons that include the following. When staff 10 is used with a camera, a user may wish to tilt the camera 90 degrees or so. If the camera has heavy lens, the weight of the lens may rotate the camera downward, i.e., the strength of the magnet alone may not be sufficient to hold the camera and lens in a fixed position. The index pattern provides sufficient resistance to hold a heavy camera and lens or spotting scope in a fixed position.

In addition, the repeating pattern in the plate and disk permits a user to move a mounted camera (or other device) in fixed intervals. In the embodiment of FIGS. 11-12, the pattern repeats every 30 degrees, permitting a user 12 settings at which to position a mounted device.

This indexed arrangement is also beneficial in permitting a photographer to take panorama or landscape photographs, for example, a user can mount a camera on the tripod and move and position it at regular intervals, enabling the photographer to take (or compile) a 360 degree wide angle composite photograph.

Figure 13:
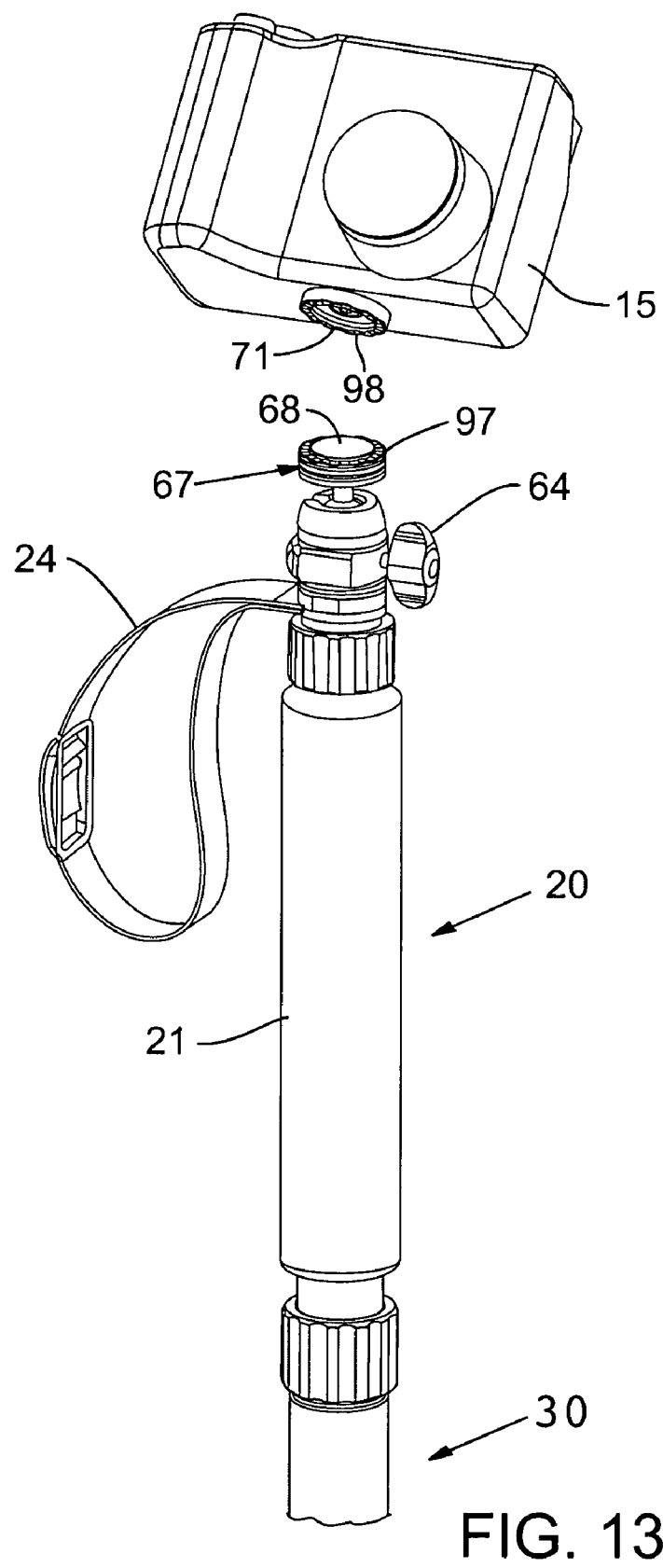
FIG. 13 is a perspective view of a camera being mounted to staff via the patterned plate and disk of FIGS. 11-12 in accordance with the present invention.

Referring to FIG. 13, a perspective view of a camera being mounted to staff 10 via patterned plate 67 and disk 71 in accordance with the present invention is shown. The attraction between magnet 68 and disk 71 causes disk 71 to be seated into the complimentary pattern of plate 67. The camera is held securely and, when tilted, in a manner that significantly impedes rotation of the camera.

The components of the present invention may by made of any suitable material, either now known or invented or discovered in the future. In one embodiment, the shaft and legs may be are preferably formed of a lightweight metal such as aluminum alloy. The release joint assembly may be made of aluminum alloy with stainless steel pins, or otherwise configured including combined in a forged assembly. The extension members and pins may be formed of a harder metal or a hard plastic and the mounting disk and plate may similarly be made of metal, plastic or other materials that provide adequate strength, lightness and durability.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The invention claimed is:

1. A walking staff apparatus, comprising:
   a shaft;
   a handle region provided at a top portion of the shaft; and
   a tripod assembly provided below and extending from the shaft that includes a base and at least three legs descending from the base that are movable between a closed position in which the legs are retracted to form a monopod and an open position in which the legs are extended outwardly;
   wherein the tripod assembly is releasably coupled to the shaft through a fastening mechanism that includes a first tapered surface provided on the shaft and a second tapered surface, complementary to the first tapered surface, provided on the base of the tripod assembly, the complementary first and second surfaces serving to center the tripod assembly with the shaft when the tripod assembly is releasably fastened to the shaft; and a magnetic-based releasable mount mechanism coupled to the shaft, the mount mechanism including a first member and a second member that are releasably coupled through magnetic attraction, the first member being fixedly coupled to the shaft and the second member adapted for attachment to an ancillary article;

wherein the tripod assembly, the shaft and the first and second surfaces are configured such that when the tripod assembly is coupled to the shaft through the fastening mechanism, the second surface is substantially flush against the first surface and the legs are readily movable between the open and closed positions.

2. The apparatus of claim 1, wherein the fastening mechanism includes a tapered threaded fitting.

3. The apparatus of claim 1, wherein the first and second tapered surfaces are conically tapered.

4. The apparatus of claim 1, wherein one of the first and second members includes a plurality of protrusions and the other includes a plurality of recesses, the plurality of protrusions and recesses being formed in a complementary manner so that when the first member and the second member are releasably coupled the protrusions fit into the recesses and prevent rotation of the first member relative to the second member.

5. The apparatus of claim 4, wherein the plurality of protrusions and recesses are provided at regular intervals and configured such that the first and second members may be released, moved relative to each other a distance of one or more regular intervals and remounted.

6. The apparatus of claim 1, wherein the shaft is a telescoping shaft having a plurality of sections and the lower of any two adjacent sections has a larger diameter than the section above.

7. The apparatus of claim 1, wherein the shaft includes first, second and third sections, the magnetic-based releasable mount mechanism coupled to the first section, the handle provided about the second section and the fastening mechanism coupled to the third section;

wherein the first section telescopes into the second section which telescopes into the third section and the first, second and third sections are configured for being wholly disconnected from one another to achieve a more compact arrangement.

8. The apparatus of claim 1, wherein the tripod assembly moves between the closed position and the open position in a manner substantially free of supplemental lateral support.

9. A walking staff apparatus, comprising:

a shaft;

a handle region provided at a top portion of the shaft;

a tripod assembly provided below and extending from the shaft that includes a base and at least three legs descending from the base that are movable between a closed position in which the legs are retracted to form a monopod and an open position in which the legs are extended outwardly, wherein the tripod assembly is releasably coupled to the shaft through a releasable fastening mechanism; and a magnetic-based releasable mount mechanism coupled to the shaft, the mount mechanism including a first member and a second member that are releasably coupled through magnetic attraction, the first member being fixedly coupled to the shaft and the second member adapted for attachment to an ancillary article; and wherein the releasable fastening mechanism includes a first tapered surface provided on the shaft and a second tapered surface, complementary to the first tapered surface, provided on a top region of the base of the tripod assembly, the complementary first and second surfaces serving to center the tripod assembly with the shaft.

10. A walking staff apparatus, comprising:

a shaft;

a handle region provided at a top portion of the shaft;

a tripod assembly provided below and extending from the shaft that includes a base and at least three legs descending from the base that are movable between a closed position in which the legs are retracted to form a monopod and an open position in which the legs are extended outwardly; and a magnetic-based releasable mount mechanism coupled to the shaft, the mount mechanism including a first member and a second member that are releasably coupled through magnetic attraction, the first member being fixedly coupled to the shaft and the second member adapted for releasable attachment to an ancillary article wherein the tripod assembly is releasably coupled to the shaft through a releasable fastening mechanism;

wherein the releasable tripod assembly in the closed position is less than half the overall height of the walking staff apparatus; and wherein the fastening mechanism includes a first tapered surface provided on the shaft and a second tapered surface, complementary to the first tapered surface, provided on a top portion of the base of the tripod assembly, the complementary first and second surfaces serving to center the tripod assembly with the shaft.

11. The apparatus of claim 9, wherein the shaft is a telescoping shaft having a plurality of sections and the lower of any two adjacent sections has a larger diameter than the section above.

12. The apparatus of claim 10, wherein the first and second tapered surfaces are conically tapered.

13. The apparatus of claim 9, wherein the tripod assembly in a closed position is less than half the overall height of the walking staff apparatus.

14. The apparatus of claim 10, wherein one of the first and second members includes a plurality of protrusions and the other includes a plurality of recesses, the plurality of protrusions and recesses being formed in a complementary manner so that when the first member and the second member are releasably coupled the protrusions fit into the recesses and prevent rotation of the first member relative to the second member; and wherein the plurality of protrusions and recesses are provided at regular intervals and configured such that the first and second members may be released, moved relative to each other a distance of one or more regular intervals, and remounted.

15. The apparatus of claim 10, wherein the shaft is a telescoping shaft having a plurality of shaft sections and the lower of any two adjacent shaft sections has a larger diameter than the section above such that the section above telescopes into the lower section.

16. The apparatus of claim 1, wherein the tripod assembly in a closed position is less than half the overall height of the walking staff apparatus.

17. The apparatus of claim 9, wherein one of the first and second members includes a plurality of protrusions and the other includes a plurality of recesses, the plurality of protrusions and recesses being formed in a complementary manner so that when the first member and the second member are releasably coupled the protrusions fit into the recesses and prevent rotation of the first member relative to the second member.

18. The apparatus of claim 17, wherein the plurality of protrusions and recesses are provided at regular intervals and configured such that the first,and second members may be released, moved relative to each other a distance of one or more regular intervals and remounted.

19. The apparatus of claim 9, wherein the first and second tapered surfaces are conically tapered.

20. The apparatus of claim 9, wherein the shaft includes first, second and third sections, the magnetic-based releasable mount mechanism coupled to the first section, the handle provided about the second section and the fastening mechanism coupled to the third section;
 wherein the first section telescopes into the second section which telescopes into the third section and the first, second and third sections are configured for being wholly disconnected from one another to achieve a more compact arrangement.

\* \* \* \* \*